United States Patent [19]

Takikawa et al.

[11] Patent Number: 5,402,829
[45] Date of Patent: Apr. 4, 1995

[54] STRUCTURE FOR HIGH-PRESSURE FUEL INJECTION TUBE AND METHOD OF MANUFACTURING THE SAME

[75] Inventors: Kazunori Takikawa; Tadahiro Uematsu, both of Numazu, Japan

[73] Assignee: Usui Kokusai Sangyo Kaisha Ltd., Japan

[21] Appl. No.: 93,396

[22] Filed: Jul. 19, 1993

[30] Foreign Application Priority Data

Jul. 20, 1992 [JP] Japan .................................. 4-214514

[51] Int. Cl.⁶ ............................................. F16L 9/00
[52] U.S. Cl. .................. 138/109; 138/96 R; 138/DIG. 6; 138/177
[58] Field of Search .............. 138/109, 172, 96 R, 138/177, 178, DIG. 11, 89.2, DIG. 6, 143; 29/509, 510, 511, 516

[56] References Cited

U.S. PATENT DOCUMENTS

| | | | |
|---|---|---|---|
| 4,266,577 | 5/1981 | Usui | 138/172 |
| 4,556,240 | 12/1985 | Yoshida | 138/109 |
| 4,850,620 | 7/1989 | Puls | 138/109 |
| 4,941,512 | 7/1990 | McParland | 138/109 |
| 5,109,888 | 5/1992 | Usui | 138/109 |

Primary Examiner—David A. Scherbel
Assistant Examiner—Patrick F. Brinson
Attorney, Agent, or Firm—Anthony J. Casella; Gerald E. Hespos

[57] ABSTRACT

Herein disclosed is a high-pressure fuel injection tube structure comprising: an injection tube body having a joint head at its one end; and a cap collar having a through hole generally at its center and such a sectional shape as to cover the joint head of the injection tube and made of a highly strong and corrosion-resistant metal material. Also disclosed is a method of manufacturing the high-pressure fuel injection tube structure. The cap collar is formed at the circumferential edge of the through hole thereof with a raised pawl wall retained on the circumferential of the communication hole of the injection tube body. The cap collar is formed with an inward flange at the end of its outer circumference. The highly corrosion-resistant metal material is one selected from the group consisting of stainless steel, inconel, hastelloy and titanium. The injection tube body has a double tube structure composed of a thicker outer tube member of steel and a thinner inner tube member of stainless steel or inconel. The joint head has a frusto-conical, arcuate or diamond shape outward of the axis of the injection tube body.

8 Claims, 4 Drawing Sheets

STRUCTURE FOR HIGH-PRESSURE FUEL INJECTION TUBE AND METHOD OF MANUFACTURING THE SAME

BACKGROUND OF THE INVENTION

1. Field of the Invention

The present invention relates to a structure for and a manufacture method of a high-pressure fuel injection tube and, more particularly, to a high-pressure fuel injection tube which has a relatively small diameter such as 20 mm or less and finds wide applications as fuel conduits of a Diesel engine.

2. Description of the Prior Art

In the prior art, the high-pressure fuel injection tube of this kind is generally manufactured, as shown in FIG. 7, by plastically deforming a joint head 12, which has a frusto-conical shape and is formed at each end of an injection tube 11, to give a pressure face 12' by pressing it directly from the outside of its axis with a punch. Incidentally, reference numeral 13 designates a sleeve washer fixed below or on the neck of the joint head 12.

In this prior art, however, the joint head 12 having the direct pressure face 12' on its surface is joined by the (not-shown) fastening nut on the recessed seat of a mating (not-shown) nozzle holder. Especially in case the fuel used has such a low boiling point and a high corrosiveness as alcohol, the pressure face 12' including the leading end face of the joint head is subjected to cavitation erosions or chemical corrosions due to the using conditions including high pressures, vibrations and repeated pressure fluctuations. If, moreover, the joint head 12 is excessively fastened in an eccentric state when it is connected, its pressure face 12' may be scratched so much that a leakage is induced when it is reused after disassembly. Due to the plastic deformation of the joint head 12, still moreover, an annular groove 14 grows deep in the inner circumference of the communication hole 11' in the vicinity of the head, thus raising the problems such as the occurrence of the cavitation erosion or corrosion and an increase in the flow resistance.

SUMMARY OF THE INVENTION

The present invention has been conceived to solve the above-specified problems concomitant with the prior art and has an object to provide a structure for and a manufacture method of a high-pressure fuel injection tube which is effectively freed from the cavitation erosion or corrosion on the pressure face including the leading end face of the joint head even if the fuel used is alcohol having a low boiling point and a high corrosiveness, which can be disassembled and used again by eliminating the scratch on the pressure face of the head, and which is enabled to minimize the possibility of the cavitation erosion and corrosion and the flow resistance in the communication hole by devising the shape of the joint head itself to minimize the depth of its inside annular groove.

In order to achieve the above-specified object, according to one aspect of the present invention, there is provided a high-pressure fuel injection tube structure which comprises: an injection tube body having a joint head at its one end; and a cap collar having a through hole generally at its center and such a sectional shape as to cover the joint head of the injection tube and made of a highly strong and corrosion-resistant metal material.

According to another aspect of the present invention, there is provided a method of manufacturing a high-pressure fuel injection tube structure, which comprises the steps of: covering an end portion of an injection tube body in advance with a cap collar; and forming a joint head having a frusto-conical, arcuate or diamond shape at the end portion of the injection tube body by chucking the portion of the injection tube body below the covered end portion and by pressing the covered end portion with a punch opened at its one end and recessed to provide the sectional shape of the joint head.

According to still another aspect of the present invention, there is provided a method of manufacturing a high-pressure fuel injection tube structure, which comprises the steps of: chucking an injection tube body just below one end portion thereof with a cap collar being set in advance in the recess of a punch; and forming a joint head having a frusto-conical, arcuate or diamond shape at the one end portion of the injection tube body by pressing the cap collar to bring it into covering engagement with the one end portion.

In further aspects of the present invention, the cap collar is formed at the circumferential edge of the through hole thereof with a raised pawl wall retained on the circumferential of the communication hole of the injection tube body. The cap collar is formed with an inward flange at the end of its outer circumference. The highly corrosion-resistant metal material is one selected from the group consisting of stainless steel, inconel, hastelloy and titanium. The injection tube body has a double tube structure composed of a thicker outer tube member of steel and a thinner inner tube member of stainless steel or inconel. The joint head has a frusto-conical, arcuate or diamond shape outward of the axis of the injection tube body.

According to the structure and manufacture method of the present invention described above, the joint head can be constructed by holding the cap collar made of a highly strong and corrosion-resistant metal material in covering engagement with the end portion of the joint head. As a result, the cap collar can effectively reduce and prevent the chemical corrosion and the mechanical cavitation erosion and corrosion on the pressure face including the leading end face of the joint head. Moreover, the pressure face of the joint head is hardly scratched even in an occentric joint so that the fuel injection tube can be disassembled and used again. Still moreover, the joint head has its volume reduced by that of the cap collar to minimize the annular groove in the inner circumference of the communication hole in the vicinity of the joint head when this joint head is plastically deformed, thereby to minimize the occurrence of the cavitation erosion and corrosion and the flow resistance in the groove and on the inner circumference of the communication hole. Thanks to the plastic deformation in the cap collar, this collar is held in the covering engagement with the joint head so that it can be kept from peeling or coming out.

DETAILED DESCRIPTION OF THE PREFERRED EMBODIMENTS

Figure 1:
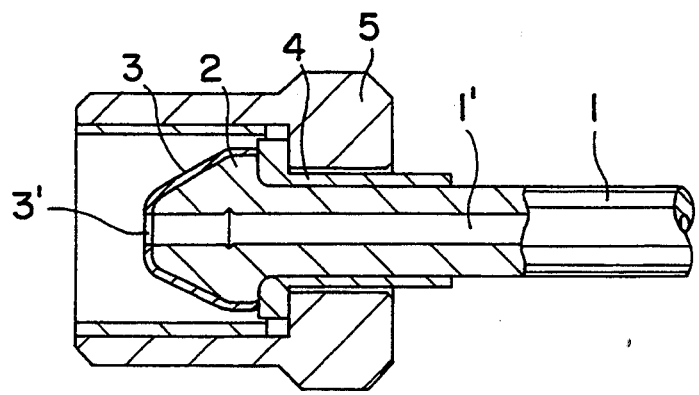
FIG. 1 is a partially cut away longitudinal section showing a joint head at one end of a high-pressure fuel injection tube according to an embodiment of the present invention.

Here will be described the present invention in connection with the embodiments thereof with reference to FIGS. 1 to 4. Reference numeral 1 designates a injection tube body which has a frusto-conical joint head 2 extending outward of its axis at one or two end portions. The tube body 1 is assembled with a sleeve washer 4 fitted on the neck below the head 2 and a fastening nut 5 to be used for connections. Moreover, the joint head 2 is covered to engage with a cap collar 3 which has a through hole 3' generally on its axis and which is made of a highly strong and corrosion-resistant metal material such as stainless steel, inconel, hastelloy or a titanium.

Figure 2:
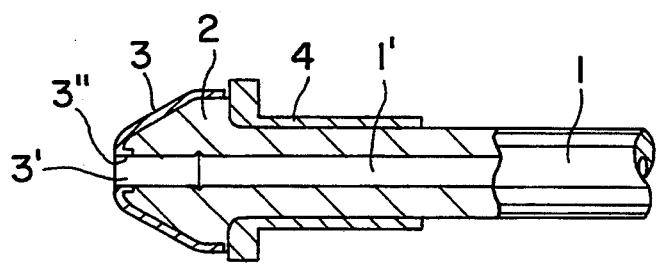
FIG. 2 is a partially cut-away longitudinal section showing an essential portion of another embodiment of the present invention.
Figure 3:
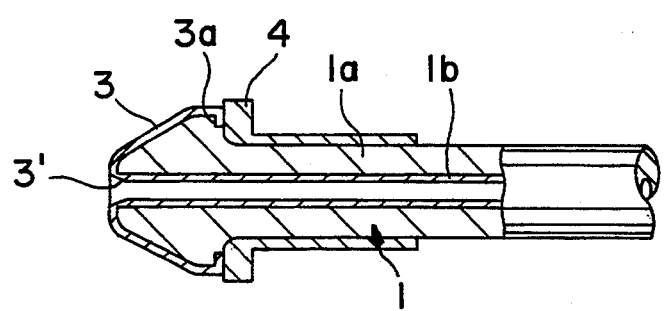
FIG. 3 is a partially cut-away longitudinal section showing still another embodiment.
Figure 5A:
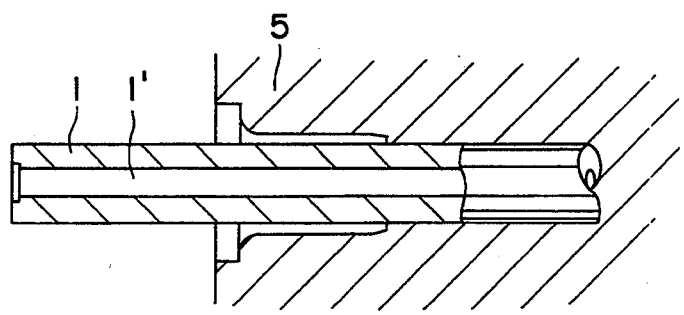
FIGS. 5A to 5D are the steps illustrating the operation of the first embodiment of the present method.
Figure 5B:
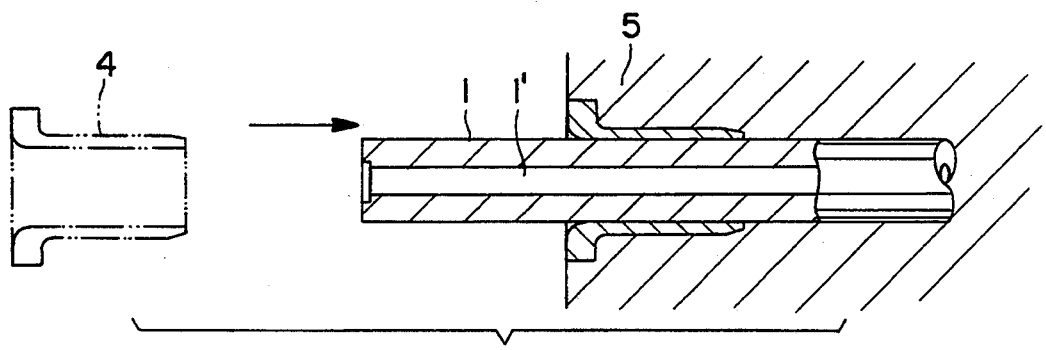
Figure 5C:
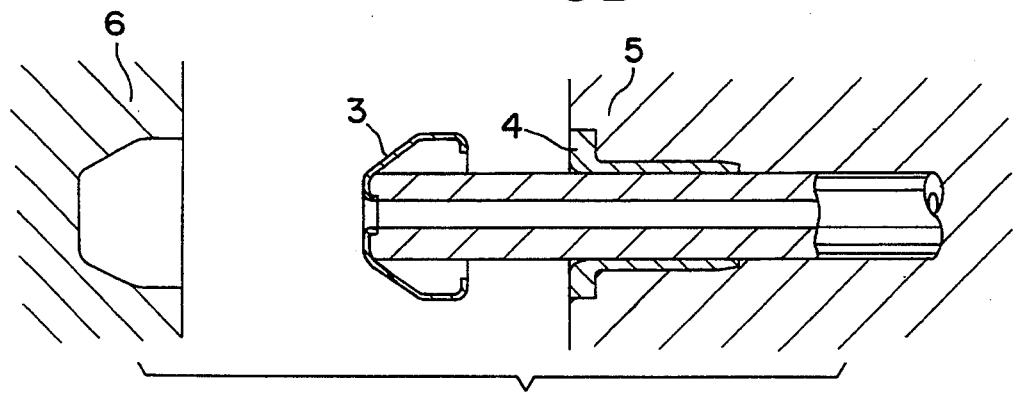
Figure 5D:
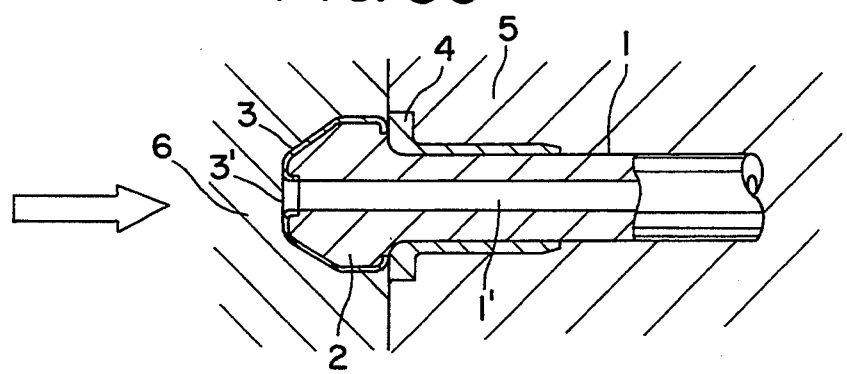
Figure 6A:
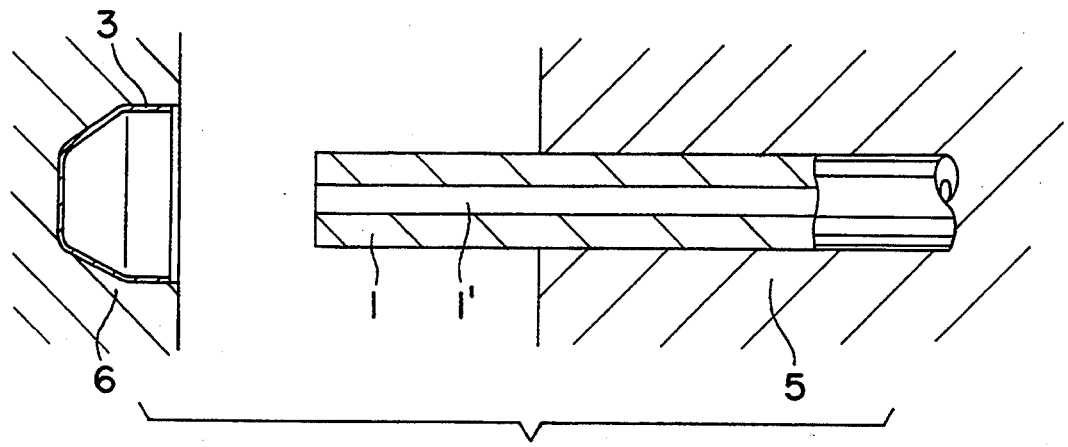
FIGS. 6A and 6B are the steps illustrating the operation of the second embodiment.
Figure 6B:
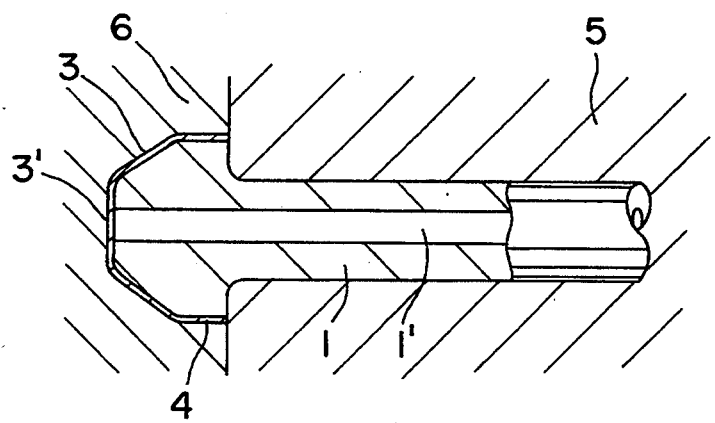
Figure 7:
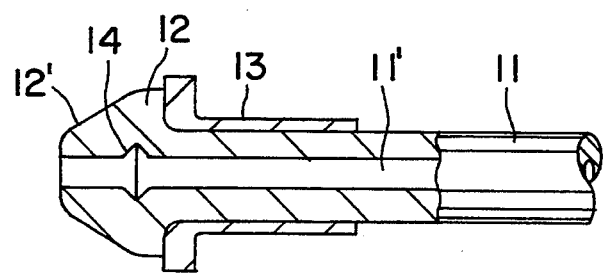
FIG. 7 is a partially cut-away longitudinal section showing the joint head of the example of the prior art.

For this covering engagement, as shown FIG. 5, the portion of at least one joint head 2 near the covered portion or the neck portion is chucked by a chuck 5 (as shown in FIG. 5A) and the injection tube body 1 is assembled in advance with the sleeve washer 4 (as shown in FIG. 5B) and the fastening tube nut 5. A raised pawl wall 3' (as shown in FIG. 2) formed on the circumferential edge of the through hole 3' is retained (or positioned) on the circumferential wall of a communication hole 1' formed in the injection tube body 1 (as shown in FIG. 5C). After this, the covered portion is pressed by a punch 6 opened at its one end, to form the frusto-conical joint head 2 (as shown in FIG. 5D). Alternatively, as shown in FIG. 6, with the sleeve washer 4 and the fastening nut 5 being assembled, the neck portion near the end portion is chucked by the chuck 5 with the cap collar 3 set in the recess of the punch 6 (as shown in FIG. 6A) so that the cap collar 3 may come into covering engagement to form the joint head 2 (as shown in FIG. 6B). If a small clearance is left at this time between the end of the outer circumference of the collar 3 and the sleeve washer 4, as shown in FIG. 2, the outer circumference end of the collar 3 can be prevented from abutting against the sleeve washer 4 and accordingly from rising. In case an alcohol fuel having an especially high corrosiveness, the injection tube body 1 may preferably be a double tube structure composed of a thicker outer tube member 1a of high-pressure tubing carbon steel (STS-370) and a thinner inner tube member 1b of stainless steel (SUS304), as shown in FIG. 3, so as to improve the corrosion-resistance. At this time, if an inward flange 3a is formed on the outer circumference end of the collar 3, the joint head 2 has its entire outer surface covered with the collar 3 so that it can be freed from any contact with the corrosive fuel thereby to improve the corrosion resistance better.

Figure 4:
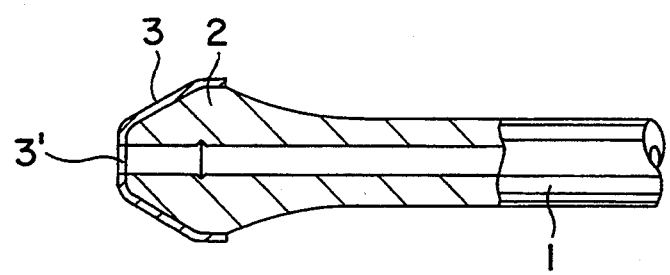
FIG. 4 is similar to FIG. 3 but shows a further embodiment.

Incidentally, the joint head 2 may be formed into a frusto-conical shape (although not shown), or preferably a diamond shape having two taper faces, i.e., a gentle slope at the neck and a steep slope, as shown in FIG. 4.

As has been described hereinbefore, according to the present invention, the joint head 2 of the injection tube body 1 can be constructed by holding the cap collar 3 made of a highly strong and corrosion-resistant metal material in covering engagement with the end portion of the joint head 2. As a result, the cap collar 3 can effectively reduce and prevent the chemical corrosion and the mechanical cavitation erosion and corrosion on the pressure face including the leading end face of the joint head 2. Moreover, the pressure face of the joint head 2 is hardly scratched even in an eccentric joint so that the fuel injection tube can be disassembled and used again. Still moreover, the joint head 2 has its volume reduced by that of the cap collar 3 to minimize the annular groove in the inner circumference of the communication hole 1' in the vicinity of the joint head 2 when this joint head 2 is plastically deformed, thereby to minimize the occurrence of the cavitation erosion and corrosion and the flow resistance in the groove and on the inner circumference of the communication hole 1'. Thanks to the plastic deformation in the cap collar 3, this collar 3 is hold in the covering engagement with the joint head 2 so that it can be kept from peeling or coming out.

What is claimed is:

1. A high-pressure fuel injection tube structure comprising: an injection tube having opposed ends and a substantially cylindrical body intermediate said ends, a communication hole extending axially through said tube, at least one said end having a joint head unitary with said body, said joint head having a neck extending outwardly from said cylindrical body and a mating face tapering inwardly to the communication hole at the respective end of the tube; and a cap collar having a through hole generally at its center registered with said communication hole of said tube and having such a sectional shape as to cover the mating face of the joint head in face-to-face engagement, said cap collar being unitarily made of a highly strong and corrosion-resistant metal material.

2. A high-pressure fuel injection tube structure according to claim 1, wherein said cap collar includes a circumferential edge surrounding the through hole thereof, portions of said cap collar adjacent said circumferential edge defining a generally tubular raised pawl wall retained on an inner circumferential surface of the communication hole of said joint head.

3. A high-pressure fuel injection tube structure according to claim 1, wherein said cap collar is formed with an inward flange at an end of its outer circumference, said inward flange being securely engaged with portions of said neck of said joint head adjacent said mating face.

4. A high-pressure fuel injection tube structure according to claim 1, wherein said highly corrosion-resistant metal material is one selected from the group consisting of stainless steel, inconel, hastelloy and titanium.

5. A high-pressure fuel injection tube structure according to claim 1, wherein said injection tube body has a double tube structure composed of a thicker outer tube member of steel and a thinner inner tube member of stainless steel or inconel.

6. A high-pressure fuel injection tube structure according to claim 1, wherein said mating face of said joint head is of generally frusto-conical shape.

7. A high-pressure fuel injection tube structure according to claim 1, wherein said neck of said joint head is of generally frusto-conical configuration.

8. A high-pressure fuel injection tube structure according to claim 1, wherein said mating face of said joint head is of generally arcuate shape.

* * * * *